United States Patent [19]
Rosen

[11] 3,747,343
[45] July 24, 1973

[54] LOW NOISE PROP-FAN
[75] Inventor: George Rosen, West Hartford, Conn.
[73] Assignee: United Aircraft Corporation, East Hartford, Conn.
[22] Filed: Feb. 10, 1972
[21] Appl. No.: 225,186

[52] U.S. Cl............... 60/226 R, 60/269, 415/119
[51] Int. Cl............................................. F02k 3/04
[58] Field of Search.................... 60/226 R, 269; 415/119

[56] References Cited
UNITED STATES PATENTS
| | | | |
|---|---|---|---|
| 3,618,699 | 11/1971 | Evans | 415/119 |
| 3,448,582 | 6/1969 | Bracey | 60/226 R |
| 3,472,321 | 10/1969 | Ellinger | 60/226 R |
| 3,505,819 | 4/1970 | Wilde | 60/226 R |
| 3,620,021 | 11/1971 | Lawrie | 60/226 R |

FOREIGN PATENTS OR APPLICATIONS
1,196,588  7/1970  Great Britain.................. 60/226 R Primary Examiner—Douglas Hart
Attorney—Norman Friedland

[57] ABSTRACT

An air propulsor having either a fixed or a variable pitch fan with blade loadings selected from a range intermediate between aircraft propeller and fan engine designs is configured so as to retain high takeoff thrust and good high-speed efficiency while providing a large reduction in noise generation. Noise is abated at its source by reducing rotative speed of the fan blades, uniquely selecting the number of stator vanes relative to the fan, and judiciously spacing the stator vanes relative to the fan and relative to each other.

10 Claims, 2 Drawing Figures

LOW NOISE PROP-FAN

BACKGROUND OF THE INVENTION

This invention relates to high bypass, variable or fixed pitch, ducted propulsion fans having downstream stator vanes and no upstream vanes hereinafter referred to as prop-fans and particularly to means for reducing the noise level generated by the fan/stator combination.

Bypass engines with many-bladed, fixed pitch fans, as for example, the 5:1 bypass JT9D engine manufactured by Pratt & Whitney Aircraft or the 6:1 bypass TF-34 engine manufactured by General Electric, exemplify the current state-of-the-art in propulsion air fans. These fans operate at fan pressure ratios of 1.4 to 1.5 and, at these loadings, require high blade solidity and must rotate at high tip speeds to achieve good performance. Consequently, such fans are known to be characterized by inherently high levels of noise generation. It is also well known in the art that to attain somewhat more acceptable noise levels, particularly when installed in commercial transport aircraft, these fans require extensive use of noise reducing devices such as long shrouds with noise absorptive liners and rings. Such noise abatement techniques have proven quite costly particularly in terms of added weight and loss in aircraft performance.

I have discovered that I can obviate the problems noted above while obtaining installed noise levels that are lower than those heretofore obtained, by operating the prop-fan within a unique range of fan pressure ratios and tip speeds which range lies between the operational points that are usual in propellers and fan engines.

Not only does my invention afford a reduction in noise levels not attainable in heretofore known propellers and fan engines, but afford better takeoff performance than heretofore obtained by conventional bypass engines while incurring less penalties in weight and no compromise in cruise performance. Prior to this invention it had been understood by those considered skilled in this art that a modest noise reduction from that of present fan engines could be realized by reducing fan pressure ratio and consequently fan tip speed. For example some work of this trend has been evidenced in publications regarding the Astafan engine manufactured in France and the Dowty-Rotol fans manufactured in England. Additionally U.S. Pat. No. 3,489,338 granted to J. A. Chilman on Jan. 13, 1970 exemplifies the current state of the art. There had been neither prior recognition nor suggestion, however, that a prop-fan operating in this intermediate pressure ratio range and at subsonic tip speed would result in much larger noise reductions when the fan/stator combination was designed in a specific aerodynamic configuration.

In accordance with this invention, I have found that the sources of fan/stator noise generation in this intermediate range of fan pressure ratios are governed by a new set of acoustic phenomena, quite different from that taught by the prior art. The critical range of fan pressure ratios for the prop-fan is between 1.05 and less than 1.30. In this range it is possible to design aerodynamically efficient fans with a moderate number of blades (6-13) and low tip speeds (600-800 ft/sec. or higher but less than sonic). It is this unique combination of fan blade count and tip speed that puts the prop-fan in a new range of acoustic frequency spectra and that radically alters the acoustic phenomena governing its noise generation.

By virtue of a study of these phenomena it was found that, unlike the prior high pressure ratio, high tip speed fans whose noise spectra were rotor dominated, the noise generated by the prop-fan, operating in this unique range of variables, would have a noise spectrum which would be stator dominated. Thus, the well established practices embodied in the teachings of the prior acoustic art, which called for the use of substantially twice the number of stator vanes as the number of rotor blades, would not be appropriate for the prop-fan. Although this prior art concept has been demonstrated to effectively reduce noise of the highly loaded, supersonic tip speed fans by suppressing some of their rotor-dominated noise frequencies, these rotor noise sources are not dominant in the prop-fan noise spectra.

With this new understanding of the acoustic phenomena of the prop-fan, I have found that the most effective means for reducing its noise signature is to use a completely new set of criteria which is contrary to the well established heretofore known criteria. The principal element of these new criteria is to have the number of stator vanes be substantially one half that of the rotor blade count instead of increasing the number of stator vanes to have a greater number than rotor blades as would be suggested by the prior art. This serves to suppress the critical stator-dominated noise frequencies in the prop-fan spectrum.

There is a further benefit of the reduced frequencies in the prop-fan spectrum which relates to the subjective response of the human ear to different frequency levels. The human ear is most sensitive to frequencies in the range of 2,500 to 5,500 Hertz. Accordingly, another important element of this invention is the unique combination of fan blade count and tip speed, previously defined, which puts the critical acoustic modes of the prop-fan well below this range. This is illustrated by the test results plotted in FIG. 1 in comparison with the noise spectra of prior types of turbofans. As a result, the prop-fan not only generates low noise energy by virtue of its reduced number of stator vanes, but the positioning of the principal acoustic modes below the sensitive frequency range results in an additional substantial reduction in perceived noise level.

There are several other criteria which are also novel and constitute a significant contribution to this invention when combined with the above described new concept. One is the use of variable pitch on the rotor blades for minimizing noise generation at off-design conditions such as at takeoff. Since the prop-fan noise generation is dominated by stator sources it is important that the periodic pressure pulses emanating from the rotor be minimized prior to their impingement on the downstream stator vanes. With variable pitch on the rotor blades, they will operate at more optimum aerodynamic angles at such off-design conditions, and thus generate weaker pressure pulses. This will serve to further suppress the stator originated noise modes. The relatively few fan blades of the prop-fan compared to prior art fans makes the mechanical implementation of variable pitch more feasible.

Another means of achieving a similar effect is to increase the linear separation between the downstream stator and the rotor. From a detailed understanding of the aerodynamic behavior of the pressure pulses shed by the rotor blades I have concluded that the linear spacing between the stator and rotor should be at least twice the dimension of the width of a single rotor blade. This will afford an additional increment of noise reduction to those previously described. The relatively few stator vanes specified by this invention also tend to be more compatible with other techniques of reducing stator noise, such as sweep, lean or nonuniform spacing of the stator vanes.

SUMMARY OF THE INVENTION

An object of this invention is to provide an improved propulsor characterized by its effectiveness of abating noise at the source.

A still further obect of this invention is to provide a prop-fan of the type described where the fan operates in the range of between 1.05 to less than 1.30 pressure ratio and less than sonic tip speed.

A still further object of this invention is a prop-fan having a multi-bladed fan and a multi-vaned aft stator where the number of vanes is substantially less than the number of blades and that the stator is axially spaced at least 2 rotor blade widths behind the rotor.

Other features and advantages will be apparent from the specification and claims and from the accompanying drawings which illustrate an embodiment of the invention.

DESCRIPTION OF THE PREFERRED EMBODIMENT

Figure 2:
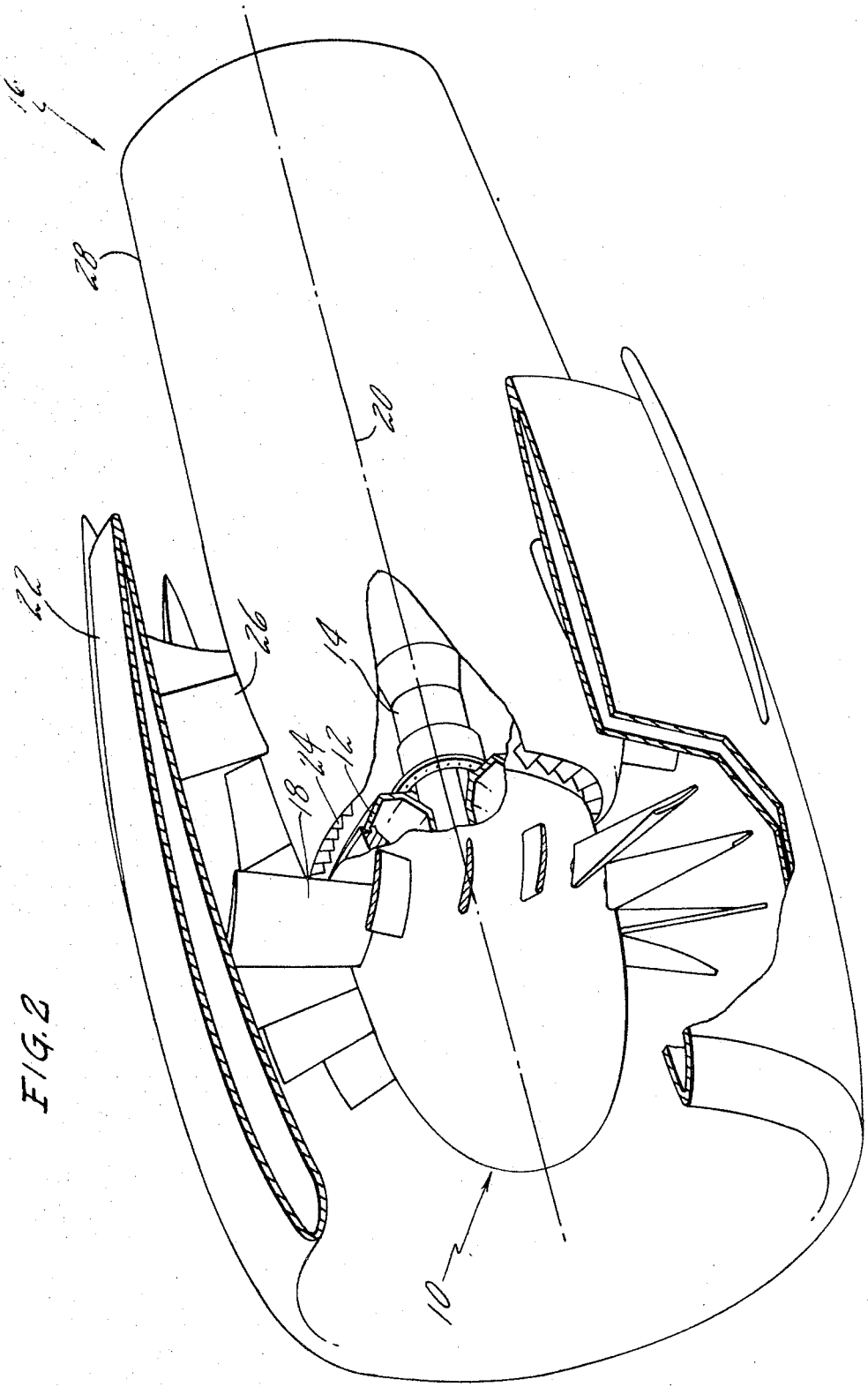
FIG. 2 is a view partly in perspective, section and schematic of the present invention.

Reference is now made to FIG. 2 illustrating a prop-fan generally illustrated by reference number 10 exemplifying the preferred embodiment of this invention. Inasmuch as the invention is primarily concerned with the abatement of noise in propulsors, the particular construction details are omitted herefrom for the sake of clarity and simplicity. It is to be understood that the particular manner in which the prop-fan is mounted to the engine and the means for effectuating pitch change movement are all principles well established in the art and need not be shown here. While the prop-fan 10 is shown to be attached to bulkhead 12 and driven by shaft 14 of gas turbine engine generally illustrated by numeral 16, it should be understood that the particular means of attachment and drive can take any other well known form. As for example, the prop-fan can be made integral with turbine power plant and either be driven by the compressor or turbine, directly ahead of the compressor or spaced therefrom as in a cross shafted assembly.

As is apparent from FIG. 2 the fan blades are mounted in and supported to a hub (not shown) about the fan rotating axis 20 within the bypass duct 22 for effectuating propulsive energy. Depending on the installation, the pitch of the fan blades may be fixed, or varied through a range of positive, negative and feathered positions in any suitable manner.

Bypass duct 22 extends beyond the engine inlet 24 so that a major portion of the air discharging from the fan is directed to bypass the engine while the relatively small remaining portion is ingested into the engine. Stators or turning vanes 26 axially spaced behind the fan are sandwiched between the inner diameter of the duct and the engine cowl 28 and serves to straighten the swirling air discharging from the fan and to support the annular duct 22.

In accordance with this invention the noise generated by the rotor and anti-swirl vanes is abated at its source, rather than employing additives intended to suppress or absorb the noise energy. To this end the prop-fan is made to operate at a tip speed that is less than sonic and within a pressure range of between 1.05 and less than 1.3. Additionally the number of stator vanes should be less than the number of fan blades and preferably the count should be substantially 1:2 and the axial spacing between the rotor and stator should be 2 rotor blades widths.

Figure 1:
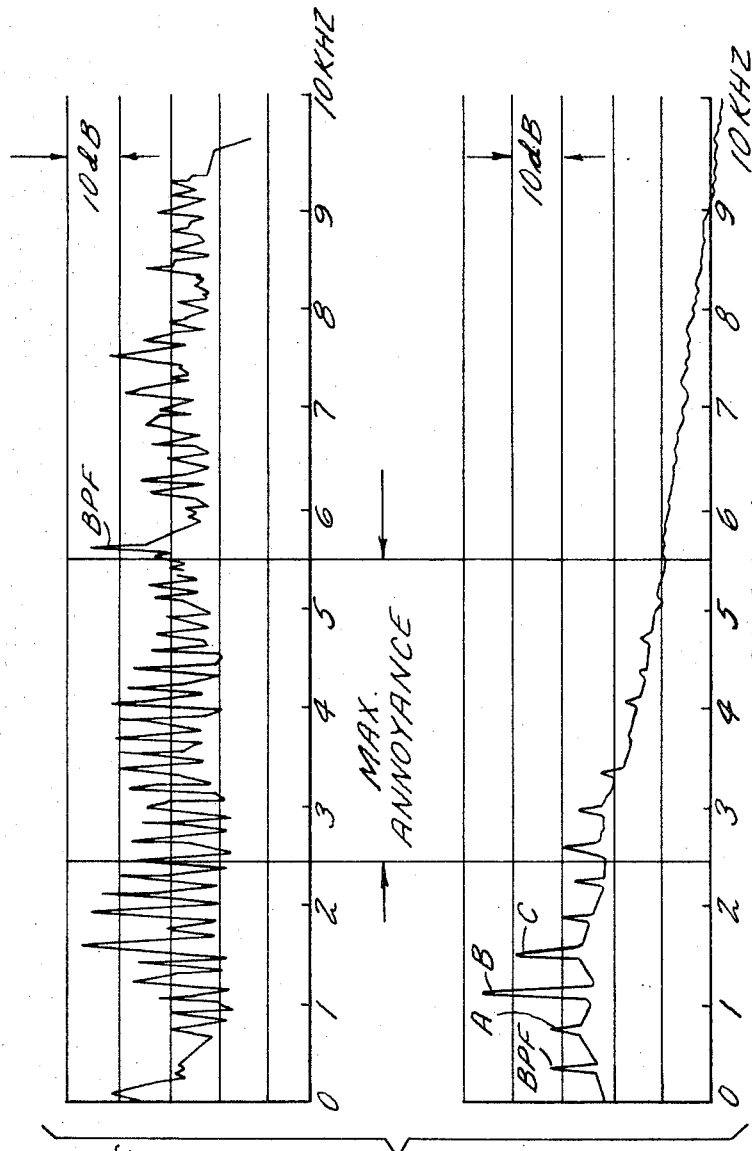
FIG. 1 is a chart showing test data illustration of the noise spectra comparing the present invention with a prior art propulsor.

It is of paramount importance that the fundamental blade passage frequency and its predominant multiples fall below the maximum annoyance band, the range of 2,500 to 5,500 Hertz as shown in FIG. 1. As can be seen in the case of a turbofan, although the fundamental blade passage frequency and its multiples tend to fall beyond the maximum annoyance range there is a large amount of broad band noise energy, which is also rotor dominated, which falls in this maximum annoyance range. It is therefore an important aspect of this invention to select the operating parameters, namely tip speed and fan pressure ratios, so that the predominant acoustic modes of the prop-fan fall below the maximum annoyance band or at a frequency that is less than 2,500 Hertz and that the broad band noise energy in the maximum annoyance band is at a substantially low level.

It will be appreciated that FIG. 1 is a representation of actual test results of prop-fans and turbofans. Prop-fans designed to and operated in the following configurations resulted in perceived noise levels that were substantially 15 to 20 PNdb (perceived noise decibels) lower than conventional turbofans.

| | |
|---|---|
| Fan Pressure Ratio | 1.05 to 1.30 |
| Number of Fan Blades | 6 to 13 |
| Fan Tip Speeds | 600 to 800 ft/sec. |
| Rotor/Stator Spacing | Greater than 2 rotor blade widths |
| Number of Stator Vanes | 3 to 7 |

Despite the remarkable abatement of noise at the source attainable through the use of the principles of this invention, the demand for minimum fan noise generation has become so stringent for many applications, such as VTOL and STOL aircraft, that some added sound absorptive treatment of the prop-fan shroud may also be required. However, at the much suppressed source noise levels of the prop-fan, the amount of absorptive material and the length of shroud required are much less than for the noisier, high-pressure-ratio, high-tip-speed fans of the prior art. This means less weight and less aerodynamic drag in cruise.

While this invention is described in its preferred embodiment as a means to obtain quiet aircraft propulsion, it will be obvious to one ordinarily skilled in the art that it has particular utility to other areas of usage where low noise and high performance fans are required, as for example, but by no means as limitations, lift fans for V/STOL aircraft, propulsion and lift fans for high speed trains and hovercraft, and ventilating fans.

It should be understood that the invention is not limited to the particular embodiments shown and described herein, but that various changes and modifications may be made without departing from the spirit or scope of this novel concept as defined by the following claims.

I claim:

1. A propulsor adapted to abate noise at its source comprising a duct, a fan rotatably mounted within the duct, means including a turbine type power plant for driving said fan at a rotational speed such that the velocity of the tips of said fan is less than sonic, an antiswirl stator disposed in the duct downstream of the fan supporting said ducts and having substantially less number of vanes than the number of fan blades, and means to operate said fan in a noise spectra, such that the fundamental blade passage frequency for all operational conditions is less than 2,500 Hertz.

2. A propulsor as claimed in claim 1 including means for rotating the blades of the fan about their longitudinal axes for effectuating pitch change movement.

3. A propulsor as claimed in claim 1 including means for maintaining the pressure ratio of the fan between 1.05 and less than 1.30.

4. A propulsor as claimed in claim 1 wherein the stator vanes are spaced at least 2 fan blade widths from the blades of the fan.

5. A propulsor as claimed in claim 1 wherein the number of stator vanes is substantially one-half the number of fan blades.

6. A prop-fan comprising a multi-bladed fan rotatably mounted in a duct, swirl recovery vanes in said duct axially spaced downstream of said fan, the number of stator vanes being substantially less than the number of fan blades, means for rotating the blades of said fan such that the tip speed of said blades is less than sonic, and the fan pressure ratio being between 1.05 and less than 1.30.

7. A prop-fan as claimed in claim 6 wherein the number of stator vanes is substantially one-half the number of fan blades.

8. A prop-fan as claimed in claim 7 wherein the space between said stator and fan is equal to at least two fan blade widths.

9. The method of operating a propulsor of the type that includes a duct, a fan driven by an engine in said duct, antiswirl vanes in said duct downstream of said fan;

rotating said fan at tip speed less than sonic, pressurizing the air ingested by said fan at a value such that the pressure ratio is between 1.05 and less than 1.30, and generating noise such that the fundamental blade passage frequency and its predominant multiples fall below 2,500 Hertz.

10. The method of operating a propulsor for powering aircraft of the type that includes a duct, a fan driven by an engine in said duct, anti-swirl vanes in said duct downstream of said fan;

rotating said fan at tip speed less than sonic, pressurizing the air ingested by said fan at a value such that the pressure ratio is between 1.05 and less than 1.30, and generating noise at all of the operating conditions of said aircraft such that the fundamental blade passage frequency falls below 2,500 Hertz.

* * * * *